US012770014B2

(12) United States Patent
White et al.

(10) Patent No.: US 12,770,014 B2
(45) Date of Patent: Oct. 20, 2026

(54) SERVICE IMPAIRMENT ISOLATION IN INFORMATION PROCESSING SYSTEM ENVIRONMENT

(71) Applicant: Dell Products L.P., Round Rock, TX (US)

(72) Inventors: William Jeffery White, Plano, TX (US); Said Tabet, Austin, TX (US); Robert A. Lincourt, Jr., Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 879 days.

(21) Appl. No.: 18/113,162

(22) Filed: Feb. 23, 2023

(65) Prior Publication Data

US 2024/0289441 A1 Aug. 29, 2024

(51) Int. Cl.

| | |
|---|---|
| ***G06N 3/092*** | (2023.01) |
| ***G06F 8/75*** | (2018.01) |
| ***G06F 8/77*** | (2018.01) |
| ***G06F 11/34*** | (2006.01) |
| ***G06F 11/3698*** | (2025.01) |

(52) U.S. Cl.

CPC ......... *G06N 3/092* (2023.01); *G06F 11/3466* (2013.01); *G06F 11/3698* (2025.01); *G06F 8/75* (2013.01); *G06F 8/77* (2013.01)

(58) Field of Classification Search

USPC .......................................................... 717/131

See application file for complete search history.

(56) References Cited

U.S. PATENT DOCUMENTS

| | | | | |
|---|---|---|---|---|
| 10,613,962 | B1 * | 4/2020 | Delange | H04L 43/16 |
| 11,176,464 | B1 * | 11/2021 | Sagi | G06N 7/01 |
| 2019/0147356 | A1 * | 5/2019 | Peng | G06N 3/088 706/21 |
| 2019/0356533 | A1 * | 11/2019 | Vasseur | G06N 3/088 |

(Continued)

OTHER PUBLICATIONS

Alhowaide et al., "PCA, Random-Forest and Pearson Correlation for Dimensionality Reduction in loT Ids," IEEE, 2020. (Year: 2020).*

(Continued)

*Primary Examiner* — Ryan D. Coyer

(74) *Attorney, Agent, or Firm* — Ryan, Mason & Lewis, LLP

(57) ABSTRACT

Application monitoring techniques in an information processing system environment are disclosed. In one example, at least one processing device is configured to obtain an indication of at least one anomalous behavior associated with execution of an application in an information processing system, wherein the application comprises a plurality of services. The processing device is further configured to analyze, across a plurality of time periods, at least one metric associated with the execution of the application to determine at least one critical path associated with the execution of the application, wherein the critical path comprises at least a portion of the plurality of services. The processing device is then configured to analyze the critical path using a set of variance correlation algorithms and identify a set of one or more services in the critical path that are highest in a ranked order determined by the set of variance correlation algorithms.

20 Claims, 7 Drawing Sheets

(56) References Cited

U.S. PATENT DOCUMENTS

| | | | | |
|---|---|---|---|---|
| 2020/0280575 | A1* | 9/2020 | Dean | H04L 63/1441 |
| 2021/0081271 | A1* | 3/2021 | Doshi | G06F 11/3476 |
| 2021/0294717 | A1* | 9/2021 | Wang | G06F 11/3409 |
| 2021/0406148 | A1* | 12/2021 | Bertran | G06F 11/0709 |
| 2022/0391917 | A1* | 12/2022 | Fan | G06N 5/02 |
| 2023/0078389 | A1* | 3/2023 | Knuff | G06N 5/022 705/7.23 |
| 2024/0069878 | A1* | 2/2024 | Li | G06F 8/41 |
| 2024/0177065 | A1* | 5/2024 | Nishimoto | G06F 8/77 |

OTHER PUBLICATIONS

Amaral et al., "MicroLens: A Performance Analysis Framework for Microservices Using Hidden Metrics With Bpf," IEEE, 2022. (Year: 2022).*

Janecek et al., "Performance Anomaly Detection through Sequence Alignment of System-Level Traces," ACM, 2022. (Year: 2022).*

Hu et al., "Unsupervised Detection of Microservice Trace Anomalies through Service-Level Deep Bayesian Networks," IEEE, 2020. (Year: 2020).*

Yu et al., "Deep Q-Network with Predictive State Models in Partially Observable Domains," Hindawi, 2020. (Year: 2020).*

Zhang et al., "CRISP: Critical Path Analysis of Large-Scale Microservice Architectures," USENIX, 2022. (Year: 2022).*

Zhu et al., "On Improving Deep Reinforcement Learning for POMDPs," arXiv, 2018. (Year: 2018).*

J. Xu et al., "Anomaly Transformer: Time Series Anomaly Detection with Association Discrepancy," arXiv:2110.02642v5, Jun. 29, 2022, 20 pages.

Wikipedia, "QUIC," https://en.wikipedia.org/wiki/QUIC, Nov. 19, 2022, 11 pages.

H. Qiu et al., "FIRM: An Intelligent Fine-grained Resource Management Framework for SLO-Oriented Microservices," Proceedings of the 14th USENIX Symposium on Operating Systems Design and Implementation, Nov. 2020, 22 pages.

U.S. Appl. No. 18/112,256 filed in the name of William Jeffery White et al. on Feb. 21, 2023, and entitled "Predictive Anomaly Detection and Fault Isolation in Information Processing System Environment."

* cited by examiner

SERVICE IMPAIRMENT ISOLATION IN INFORMATION PROCESSING SYSTEM ENVIRONMENT

FIELD

The field relates generally to information processing, and more particularly to techniques for managing information processing systems.

BACKGROUND

Information processing systems that execute application programs or, more simply, applications, are increasingly deployed in a distributed manner. For example, processing of application tasks may occur on different computing devices that can be distributed functionally and/or geographically. The information processing system environment may also have a large amount of computing devices and, overall, process a vast amount of data. Nonetheless, applications may still need to efficiently execute and, in many cases, must meet certain objectives. While impairments in the information processing system environment can significantly hamper such objectives, they can be difficult to detect and/or isolate when the information processing system environment is distributed in nature.

SUMMARY

Illustrative embodiments provide application monitoring techniques comprising service impairment isolation for use in an information processing system environment.

In one embodiment, an apparatus comprises at least one processing device comprising a processor coupled to a memory. The processing device is configured to obtain an indication of at least one anomalous behavior associated with execution of an application in an information processing system, wherein the application comprises a plurality of services. The processing device is further configured to analyze, across a plurality of time periods, at least one metric associated with the execution of the application to determine at least one critical path associated with the execution of the application, wherein the critical path comprises at least a portion of the plurality of services. The processing device is then configured to analyze the critical path using a set of variance correlation algorithms and identify a set of one or more services in the critical path that are highest in a ranked order determined by the set of variance correlation algorithms, wherein the identified set of one or more services is considered to be associated with the anomalous behavior. Advantageously, for example, the one or more services that are likely a cause of the anomalous behavior and impairing operations of the application can be isolated or otherwise identified.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud and edge computing and storage systems, as well as other types of processing systems comprising various combinations of physical and virtual processing resources.

Figure 1:
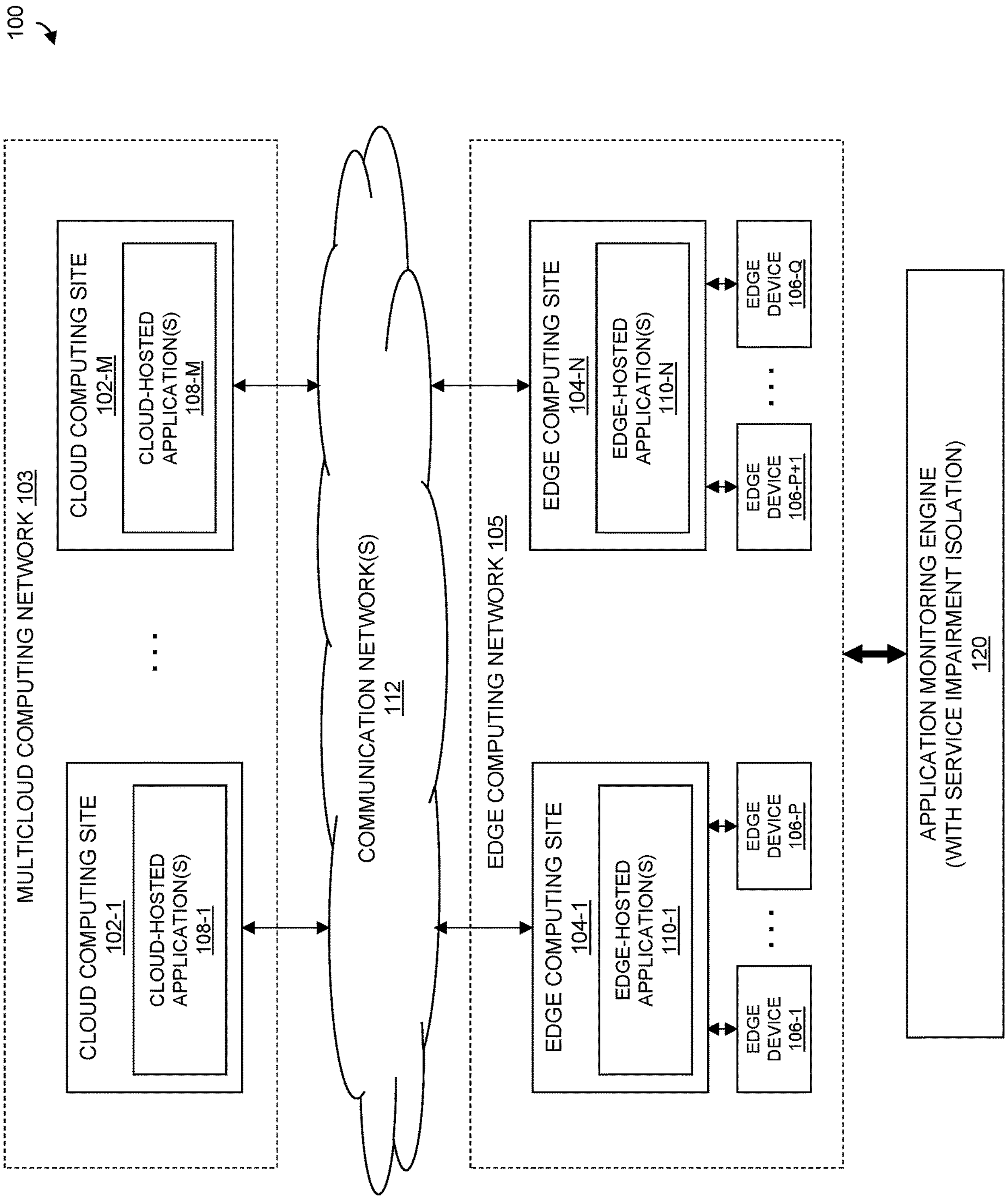
FIG. 1 illustrates an information processing system environment configured with application monitoring functionalities according to an illustrative embodiment.

FIG. 1 shows an information processing system environment 100 configured in accordance with an illustrative embodiment. The information processing system environment 100 is illustratively assumed to be implemented across multiple processing platforms and provides functionality for application monitoring with service impairment isolation as will be further described below.

The information processing system environment 100 comprises a set of cloud computing sites 102-1, . . . 102-M (collectively, cloud computing sites 102) that collectively comprise a multicloud computing network 103. Information processing system environment 100 also comprises a set of edge computing sites 104-1, . . . 104-N (collectively, edge computing sites 104, also referred to as edge computing nodes or edge servers 104) that collectively comprise at least a portion of an edge computing network 105. The cloud computing sites 102, also referred to as cloud data centers 102, are assumed to comprise a plurality of cloud devices or cloud nodes (not shown in FIG. 1) that run sets of cloud-hosted applications 108-1, . . . 108-M (collectively, cloud-hosted applications 108). Each of the edge computing sites 104 is assumed to comprise compute infrastructure or edge assets (not shown in FIG. 1) that run sets of edge-hosted applications 110-1, . . . 110-N (collectively, edge-hosted applications 110). As used herein, the term "application" is intended to be broadly construed to include applications, microservices, and other types of services.

Information processing system environment 100 also includes a plurality of edge devices that are coupled to each of the edge computing sites 104 as part of edge computing network 105. A set of edge devices 106-1, . . . 106-P are coupled to edge computing site 104-1, and a set of edge devices 106-P+1, . . . 106-Q are coupled to edge computing site 104-N. The edge devices 106-1, . . . 106-Q are collectively referred to as edge devices 106. Edge devices 106 may comprise, for example, physical computing devices such as Internet of Things (IoT) devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

Edge devices 106 in some embodiments comprise respective computers associated with a particular company, organization or other enterprise. In addition, at least portions of information processing system environment 100 may also be referred to herein as collectively comprising an "enterprise." Numerous other operating scenarios involving a wide variety of different types and arrangements of processing nodes are possible, as will be appreciated by those skilled in the art.

Note that the number of different components referred to in FIG. 1, e.g., M, N, P, Q, can each be different numbers or some of them the same numbers. Embodiments illustrated herein are not intended to be limited to any particular numbers of components.

As shown in FIG. 1, edge computing sites 104 are connected to cloud computing sites 102 via one or more communication networks 112 (also referred to herein as networks 112). Although not explicitly shown, edge devices 106 may be coupled to the edge computing sites 104 via networks 112. Networks 112 coupling the cloud computing sites 102, edge computing sites 104 and edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network couples edge devices 106 to edge computing sites 104, while a second type of network couples the edge computing sites 104 to the cloud computing sites 102. Various other examples are possible.

In some embodiments, one or more of cloud computing sites 102 and one or more of edge computing sites 104 collectively provide at least a portion of an information technology (IT) infrastructure operated by an enterprise, where edge devices 106 are operated by users of the enterprise. The IT infrastructure comprising cloud computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of cloud computing sites 102 and/or one or more of the edge computing sites 104. A given enterprise system may host assets that are associated with multiple enterprises (e.g., two or more different businesses, organizations or other entities). In another example embodiment, one or more of the edge computing sites 104 may be operated by enterprises that are separate from, but communicate with, enterprises which operate one or more cloud computing sites 102.

Although not explicitly shown in FIG. 1, one or more input-output devices such as keyboards, displays or other types of input-output devices may be used to support one or more user interfaces to each of cloud computing sites 102, edge computing sites 104 and edge devices 106, as well as to support communication between each of cloud computing sites 102, edge computing sites 104, edge devices 106, and other related systems and devices not explicitly shown.

As noted above, cloud computing sites 102 host cloud-hosted applications 108 and edge computing sites 104 host edge-hosted applications 110. Edge devices 106 may exchange information with cloud-hosted applications 108 and/or edge-hosted applications 110. For example, edge devices 106 or edge-hosted applications 110 may send information to cloud-hosted applications 108. Edge devices 106 or edge-hosted applications 110 may also receive information (e.g., such as instructions) from cloud-hosted applications 108.

It should be noted that, in some embodiments, requests and responses or other information may be routed through multiple edge computing sites. While FIG. 1 shows an embodiment where each edge computing site 104 is connected to cloud computing sites 102 via the networks 112, this is not a requirement. In other embodiments, one or more of edge computing sites 104 may be connected to one or more of cloud computing sites 102 via one or more other ones of edge computing sites 104 (e.g., edge computing sites 104 may be arranged in a hierarchy with multiple levels, possibly including one or more edge data centers that couple edge computing sites 104 with cloud computing sites 102).

It is to be appreciated that multicloud computing network 103, edge computing network 105, and edge devices 106 may be collectively and illustratively referred to herein as a "multicloud edge platform." In some embodiments, edge computing network 105 and edge devices 106 are considered a "distributed edge system."

Still further shown in FIG. 1, information processing system environment 100 comprises an application monitoring engine 120. Application monitoring engine 120 is generally shown connected to edge computing network 105 meaning that application monitoring engine 120 is connected to each of edge computing sites 104, edge-hosted applications 110, edge devices 106, and one or more other components (not expressly shown in FIG. 1) that are part of or otherwise associated with edge computing network 105. In some embodiments, an edge orchestration and scheduling platform (e.g., a cloud native (CN) orchestrator) and one or more edge zone controllers may be part of edge computing network 105 and, accordingly, connected to application monitoring engine 120. Application monitoring engine 120 is also connected to each of cloud computing sites 102, cloud-hosted applications 108, and one or more other components (not expressly shown in FIG. 1) that are part of or otherwise associated with multicloud computing network 103 via edge computing network 105 and the one or more communication networks 112, and/or through one or more other networks.

While application monitoring engine 120 is shown as a single block external to edge computing network 105, it is to be appreciated that, in some embodiments, parts or all of application monitoring engine 120 may be implemented within edge computing network 105 and reside on one or more of the components that comprise edge computing network 105. For example, modules that constitute application monitoring engine 120 may be deployed on one or more of edge computing sites 104, edge devices 106, and any other components not expressly shown. In some alternative embodiments, one or more modules of application monitoring engine 120 can be implemented on one or more cloud computing sites 102. Also, it is to be understood that while application monitoring engine 120 refers to application monitoring, the term application is intended to be broadly construed to include applications, microservices, and other types of services.

As will be explained in greater detail herein, application monitoring engine 120 is configured to provide service impairment isolation functionalities in the multicloud edge platform embodied via multicloud computing network 103 and edge computing network 105.

For example, it is realized that applications can typically be deployed as a distributed microservice design pattern within edge computing network 105. Even monolithic applications can also have distributed execution patterns across highly distributed edge systems. Microservices are groups of software processes in a service dependency graph that communicate through application programming interfaces (APIs) to achieve the software design objectives. These services communicate through representational state transfer (REST) or Google remote procedure call (gRPC) APIs in a general semi-stateful or stateless manner. The microservices application pattern enables separate execution patterns for independent updates and viable horizontal scaling in response to demand. In addition, future application design patterns such as Function-as-a-Service (FaaS) will also require detailed and complex multi-component execution.

However, troubleshooting isolation can be more complex than in monolithic design patterns because an orchestrated collaborative execution of multiple services processes is required for output. In addition, microservices may be deployed across multiple systems creating complex networking and other resource interactions, as well as interaction with common software utilities, database, security authentication, etc. This is in addition to potential security attacks, software defects, and contention with other applications.

It is realized herein that determining that a systemic impairment is occurring can be difficult, however, once an impairment is identified, it is important to be able to determine the service or services that are malfunctioning. Direct measures of service level performance based on service level objective (SLO) metrics are no better than random probability selection. This is due to the dependency of the services on other services and on common resources.

Illustrative embodiments overcome the above and other technical drawbacks associated with existing approaches to service impairment isolation by providing systems and processes for determining and isolating a microservice(s) that is causing an application to malfunction. Further details of application monitoring engine 120 with service impairment isolation will be explained below in the context of FIGS. 2-4B.

Referring still to FIG. 1, in some embodiments, edge data from edge devices 106 may be stored in a database or other data store (not shown), either locally at edge computing sites 104 and/or in processed or transformed format at different endpoints (e.g., cloud computing sites 102, edge computing sites 104, other ones of edge devices 106, etc.). The database or other data store may be implemented using one or more storage systems that are part of or otherwise associated with one or more of cloud computing sites 102, edge computing sites 104, and edge devices 106. By way of example only, the storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Cloud computing sites 102, edge computing sites 104, edge devices 106, and application monitoring engine 120 in the FIG. 1 embodiment are assumed to be implemented using processing devices, wherein each such processing device generally comprises at least one processor and an associated memory.

It is to be appreciated that the particular arrangement of cloud computing sites 102, edge computing sites 104, edge devices 106, cloud-hosted applications 108, edge-hosted applications 110, communications networks 112, and application monitoring engine 120 illustrated in the FIG. 1 embodiment is presented by way of example only, and alternative arrangements can be used in other embodiments.

It is to be understood that the particular set of components shown in FIG. 1 is presented by way of illustrative example only, and in other embodiments additional or alternative components may be used. Thus, another embodiment may include additional or alternative systems, devices and other network entities, as well as different arrangements of modules and other components.

Cloud computing sites 102, edge computing sites 104, edge devices 106, application monitoring engine 120, and other components of the information processing system environment 100 in the FIG. 1 embodiment are assumed to be implemented using one or more processing platforms each comprising one or more processing devices having a processor coupled to a memory. Such processing devices can illustratively include particular arrangements of compute, storage, and network resources.

Cloud computing sites 102, edge computing sites 104, edge devices 106, application monitoring engine 120, or components thereof, may be implemented on respective distinct processing platforms, although numerous other arrangements are possible. For example, in some embodiments at least portions of edge devices 106, edge computing sites 104, and application monitoring engine 120 may be implemented on the same processing platform. One or more of edge devices 106 can therefore be implemented at least in part within at least one processing platform that implements at least a portion of edge computing sites 104. In other embodiments, one or more of edge devices 106 may be separated from but coupled to one or more of edge computing sites 104. Various other component coupling arrangements are contemplated herein.

The term "processing platform" as used herein is intended to be broadly construed so as to encompass, by way of illustration and without limitation, multiple sets of processing devices and associated storage systems that are configured to communicate over one or more networks. For example, distributed implementations of information processing system environment 100 are possible, in which certain components of the system reside in one data center in a first geographic location while other components of the system reside in one or more other data centers in one or more other geographic locations that are potentially remote from the first geographic location. Thus, it is possible in some implementations of the system for cloud computing sites 102, edge computing sites 104, edge devices 106, and application monitoring engine 120, or portions or components thereof, to reside in different data centers. Distribution as used herein may also refer to functional or logical distribution rather than to only geographic or physical distribution. Numerous other distributed implementations are possible.

In some embodiments, information processing system environment 100 may be implemented in part or in whole using a Kubernetes container orchestration system. Kubernetes is an open-source system for automating application deployment, scaling, and management within a container-based information processing system comprised of components referred to as pods, nodes and clusters. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based IT organizations to deploy its application programs (applications). By way of example only, such applications may include stateless (or inherently redundant applications) and/or stateful applications. While the Kubernetes container orchestration system is used to illustrate various embodiments, it is to be understood that alternative container orchestration systems, as well as information processing systems other than container-based systems, can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod. It is to be appreciated, however, that embodiments are not limited to Kubernetes container orchestration techniques or the like.

Additional examples of processing platforms utilized to implement cloud computing sites 102, edge computing sites 104, edge devices 106, application monitoring engine 120, and other components of the information processing system environment 100 in illustrative embodiments will be described in more detail below in conjunction with FIGS. 6 and 7.

As explained above, when an information processing system environment is distributed in nature such as, for example, information processing system environment 100, service impairment isolation can be significantly hampered. In addition, when the applications that are executed in the information processing system environment, e.g., cloud-hosted applications 108 and edge-hosted applications 110, are microservices, the nature of microservices can greatly exacerbate service impairment isolation.

Figure 2:
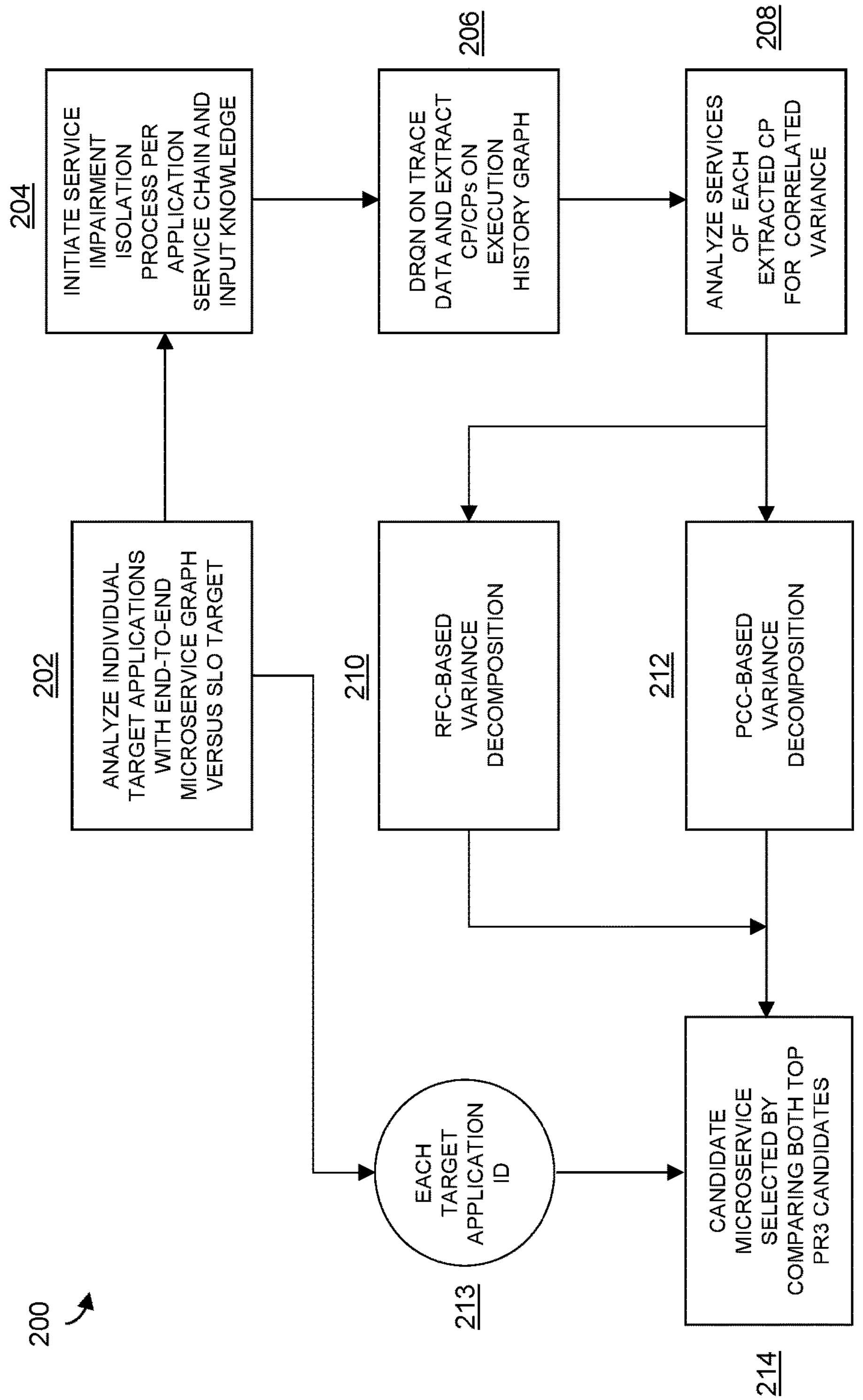
FIG. 2 illustrates an exemplary application monitoring process for service impairment isolation according to an illustrative embodiment.

Referring now to FIG. 2, an exemplary application monitoring process 200 (also referred to herein simply as process 200) is depicted for service impairment isolation according to an illustrative embodiment. It is to be appreciated that process 200, in some embodiments, is implemented via application monitoring engine 120 of FIG. 1. However, steps in process 200 can be implemented in one or more components of edge computing network 105 and, and multicloud computing network 103 as may be needed. Process 200 according to illustrative embodiments overcomes the above and other drawbacks with existing service impairment isolation, especially in a multicloud edge platform wherein at least some of the applications executing therein are microservices.

More particularly, as will be explained in detail below, process 200 is configured as a multiphase approach for isolating potential malfunctioning microservices. It is assumed that process 200 is provided with one or more anomalies and/or faults (anomalous behavior) that have been detected in information processing system environment 100. A system fault or network fault will initiate several anomalies as applications on the affected systems or network segment will fail. Illustrative embodiments segment the system malfunctions and identify potential failing services.

It is realized, however, that service impairments do not have certain state. In fact, the root causes and the application failure or impairment mode are also not clear. It is very difficult to identify root cause because the at-fault service can be hard to identify and there are potentially hidden factors that are causing the service to malfunction. Another issue is that many times when application/services are malfunctioning, the failure is not a hard failure, i.e., the application continues to operate in an intermittent or degraded state. This is a major issue, as these failures are "silent" yet may be causing major issues for end users. Thus, once a potential anomaly of operation is detected, process 200 executes steps to confirm the anomaly and determine high probability services correlated to the failure.

When service impairments occur at the application, the SLO indicators will begin to vary from normal behavior and be detected. For example, based on the SLO metric application response latency, the latency will increase at the application level. Today's state of the art approaches would attempt to determine the causal service by measuring response latency of each of the application constituent services and selecting the service with the longest latency. However, this existing approach ignores that the service may naturally have longer latency, and also does not reflect that the service is not operating properly, and current latency distribution is not normal. A truer indicator of a malfunctioning or impaired service is the variance of the SLO metrics.

Illustrative embodiments, as will be illustratively described below in the context of process 200, adapt this variance concept and thereby analyze the SLO metric/metrics across multiple time periods:

(i) 1st time period prior to anomaly detection assumed to be normal (e.g., usually 24 hours earlier than the abnormal period to compensate for diurnal load variation);

(ii) 2nd time period is when anomalous condition detected and abnormal (e.g., the abnormal condition needs three failures of five minute periods in 30 minutes capturing the 30 minute period for analysis); and (iii) 3rd time period is after application trace is activated known as trace (e.g., the trace is started upon declaration of anomalous behavior).

The analysis determines the critical path services of the service graph. Now that the application is in execution, actual SLO data can be used. There may be multiple critical paths detected in the data. In illustrative embodiments, this is accomplished using of a Deep Recurrent Q Network (DRQN) as part of a model free, memory reinforcement learning approach. The critical path (CP) services are analyzed to determine variance correlation via two methods: (i) Random Forest Classification (RFC); and (ii) Pearson Correlation Coefficient (PCC) also known as zero order correlation. The output is the highest N (e.g., three) correlated services. In some embodiments, these service impairment isolation functionalities can be implemented on an edge zone controller.

Accordingly, with reference to FIG. 2, step 202 analyzes individual target applications with end-to-end microservice graphs versus SLO targets. Step 204 initiates the service impairment isolation process per application service chain and input knowledge. Step 206 applies the DRON on trace data and extracts one or more critical paths (CPs) on an execution history graph.

Step 208 analyzed services of each extracted CP for correlated variance using both RFC-based variance decomposition (step 210) and PCC-based variance decomposition (step 212). Then, for each target application 213 (identified by step 202), step 214 selects the top N candidate microservices (e.g., the three probable services or PR3 services) by comparing both RFC-based variance decomposition results from step 210 with PCC-based variance decomposition results from step 212.

Figure 3:
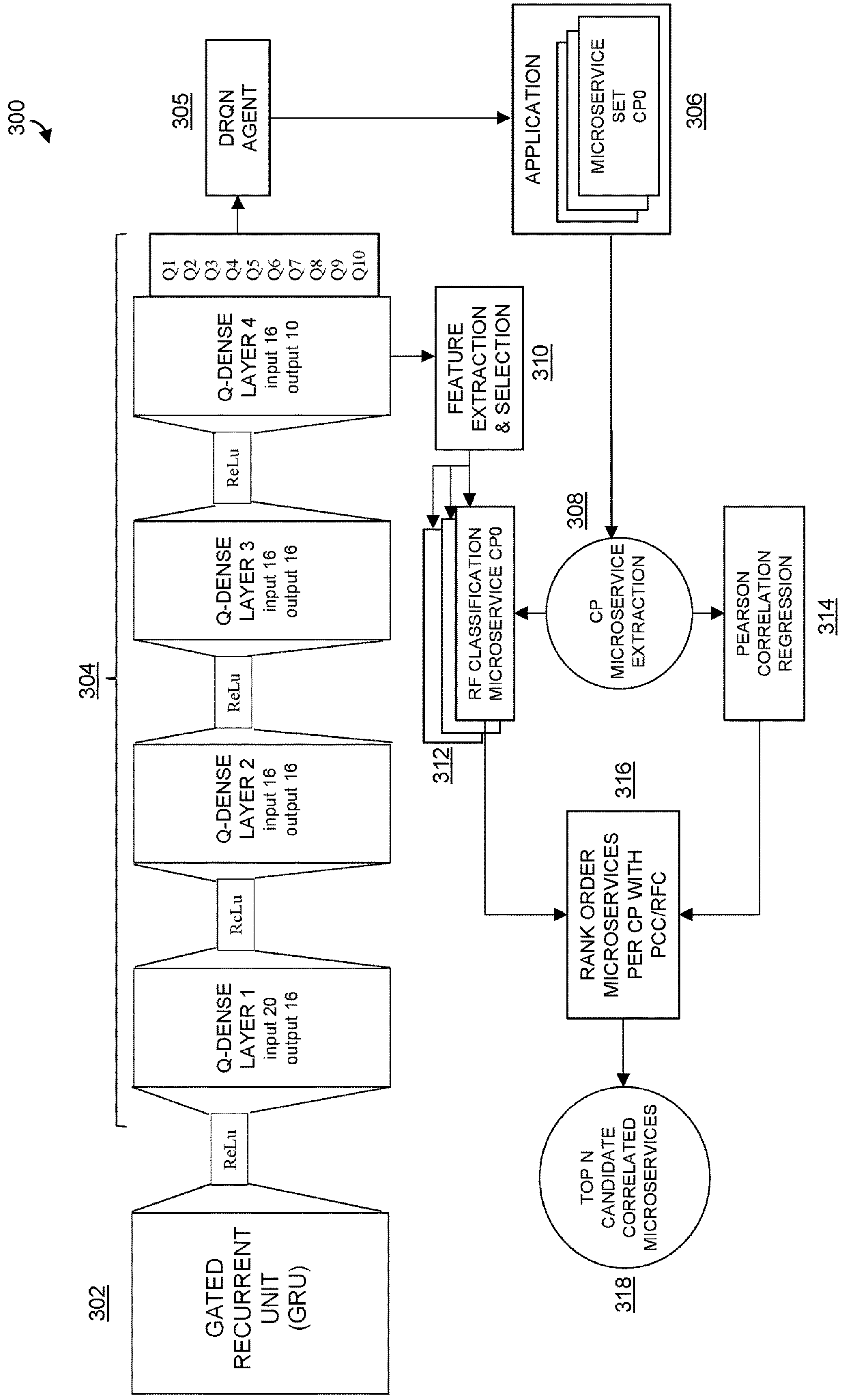
FIG. 3 illustrates an exemplary service impairment isolation algorithm according to an illustrative embodiment.

FIG. 3 illustrates an exemplary implementation of a service impairment isolation algorithm 300 according to an illustrative embodiment. More particularly, service impairment isolation algorithm 300 depicts further details of the multiphase (e.g., DRQN/RFC/PCC) variance correlation approach of process 200 of FIG. 2.

Accordingly, each critical path (CP) is extracted using a machine learning-based approach known as reinforcement learning that uses a Deep Recurrent Q Network (DRQN). DRQN is based on Deep Q learning. Deep Q learning is an unsupervised, model-free, off-policy reinforcement learning technique that substitutes a neural network to estimate the optimal action-state values (Q-values). In addition, a recurrent layer is added to provide memory that can limit the search space and optimize the Q learning process. Thus, in the context of FIG. 3, the recurrent layer is shown as gated recurrent unit (GRU) 302 and the DQRN is represented by the four Q-dense layer network 304. A service graph is established using CPU (CU) and Network Utilization (NU) (99% mean value) SLO metrics similar to the Day-One algorithm for each time study period. Each service uses its individual NU. The NU is divided by the number of edges per service and the pairwise service is also calculated similarly to the NU levels and are summed for the two service NUs for the edge. The graph is set up for the three time periods explained above (i.e., normal operation, abnormal operation, trace operation).

Thus, in the DRQN phase, a DRQN agent 305 explores the service graph and identifies the CPs 306. A reward is calculated by adding the graph edge NU and the next service CU for each edge. The output is the three sets of services defining each CP for normal, abnormal, and trace operations.

The next phase is to analyze the results to determine the services that are most correlated to the application SLO metric variance. This is referred to as determining variable importance of services to the overall application performance. This is accomplished, for each extracted microservice of a CP (extraction step 308), via RFC-based variance decomposition (steps 310 and 312) and PCC-based variance decomposition (step 314).

RFC as illustratively depicted as steps 310 and 312 is a machine learning classification process. More particularly, in parallel with the execution of the DRQN 304, the application level SLO metric (1st to n) service from the service dependency graph is trained/programmed on the RFC wherein there is one RFC for each dataset (e.g., normal, abnormal, trace). The DRQN agent 305 determines the CP services for each dataset. The CP services' SLO metrics are extracted in step 308 for each time period. The RFC's are programmed/trained with the variance of the SLO metric at the application level. The SLO metric datasets are normalized (e.g., 0-100). Variance for each subset is calculated on the normalized data for each data time sample. In one exemplary embodiment, the target is set to the time interval to collect sufficient SLO metrics to calculate relative variance over 300-600 datapoints (e.g., variance calculated over a sub-time interval of the period with a moving average, e.g., one minute of 5-second samples yields samples, calculate mean over 12 samples and then variance for each sample, then a 30-minute time period would provide 360 relative variance datapoints). It is important to use a consistent time period and a consistent interval which are synchronized. The trace data is collected at a much higher density over a shorter period of time (e.g., about five minutes) and can still produce 300-600 datapoints. This creates a dataset of variance for each service and based on the constant (across application and CP) sub-sampling period. Gradients are calculated per datapoint to create additional datasets. At completion, there are six classification datasets (e.g., normal, abnormal, trace for variance and gradient of variance change).

Figure 4A:
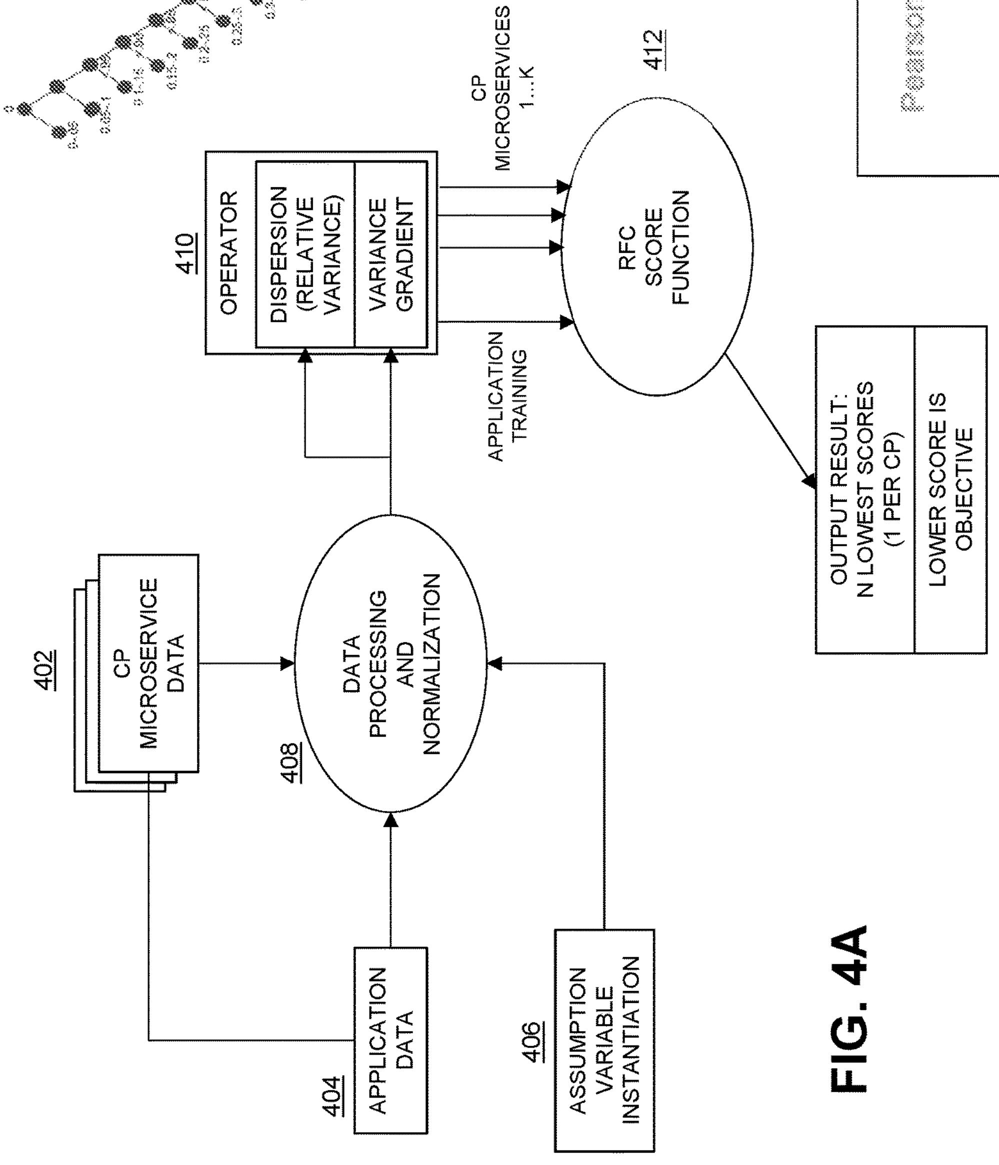
FIG. 4A illustrates an exemplary random forest classification variance score ranking algorithm according to an illustrative embodiment.

The application variance dataset is trained on a random forest. Each of the datasets are classified and scored between each CP service and application, and the lowest score for variance and gradient for each are combined. The output is a rank order by correlation for each dataset. FIG. 4A illustrates an RFC variance score ranking algorithm 400 that can be implemented to perform the RFC-based variance decomposition as part of steps 310 and 312 of service impairment isolation algorithm 300.

As FIG. 4A illustrates, datasets comprising CP microservice data 402, application data 404, and assumption variable instantiation 406 are input to a data (pre-)processing and normalization module 408. Operator module 410 then computes dispersion (relative variance) and variance gradient on the pre-processed/normalized datasets. RFC score function 412 is then run to generate output results 414 comprising the N lowest scores (one per CP). A sample score ranking data structure 420 is also shown in FIG. 4A.

Figure 4B:
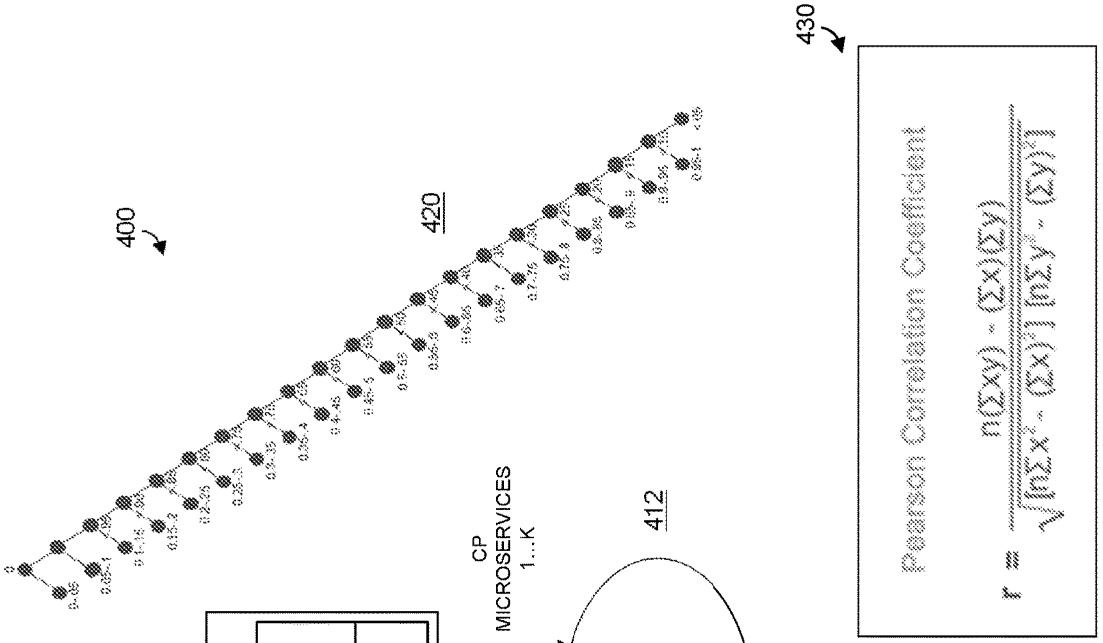
FIG. 4B illustrates an exemplary Pearson correlation coefficient algorithm according to an illustrative embodiment.

Returning to FIG. 3, in parallel with RFC-based processing of step 312, step 314 calculates PCC (also known as Zero Order Correlation or ZOC) for each service compared to the overall application. FIG. 4B illustrates the PCC calculation 430 according to an illustrative embodiment. This creates a rank order of services by PCC/ZOC.

Step 316 combines the results of steps 312 and 314 based on a weighting, e.g., 65% for RFC and 35% for PCC/ZOC, to create three rank order lists of correlated service variance to application variance.

Tests are applied based on the three sets of correlated services via a deterministic rules-based decision based on the clustering of the rank order, wherein bias is given to abnormal and trace as they are during anomalous operation. If all three timeframes are correlated, this provides a strong indicator of no stable operation and overall resource congestion. The top N (e.g., three) services (depicted as 318), which represent the services (microservices) that are likely the reason or a reason for the detected anomalous behavior and operational impairment, can then be sent to one or more additional systems, or other destination, for causal analysis and eventual remediation.

Figure 5:
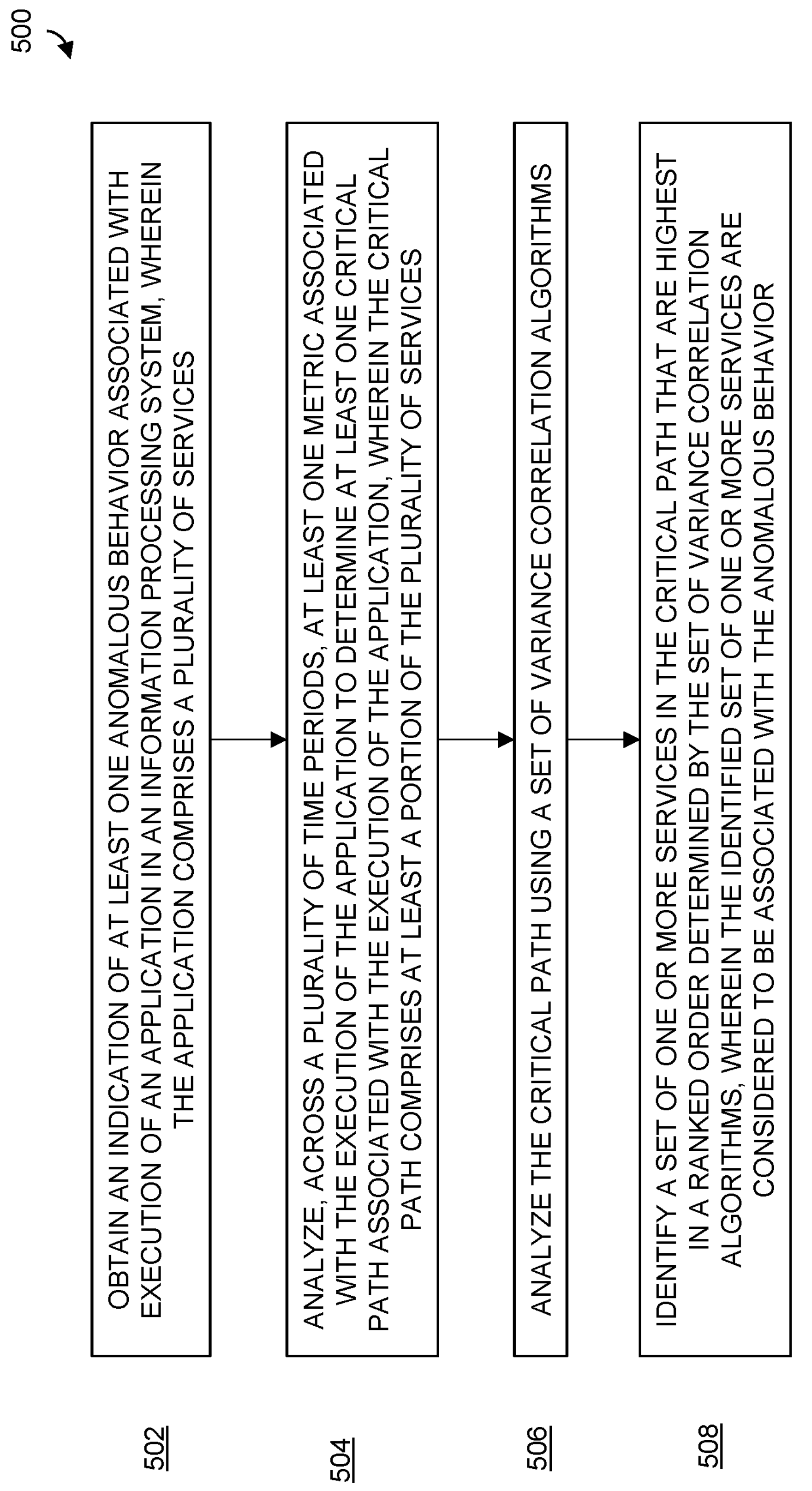
FIG. 5 shows a process flow for application monitoring with service impairment isolation according to an illustrative embodiment.

FIG. 5 shows a process flow 500 for application monitoring with service impairment isolation according to an illustrative embodiment. In one or more exemplary embodiments, process flow 500 is performed in accordance with information processing system environment 100 (i.e., multicloud edge platform) in conjunction with application monitoring engine 120 using processes depicted in FIGS. 2, 3, 4A and 4B.

As shown, process flow 500 begins in step 502 which obtains an indication of at least one anomalous behavior associated with execution of an application in an information processing system, wherein the application comprises a plurality of services. Step 504 analyzes, across a plurality of time periods, at least one metric associated with the execution of the application to determine at least one critical path associated with the execution of the application, wherein the critical path comprises at least a portion of the plurality of services. Step 506 analyzes the critical path using a set of variance correlation algorithms. Step 508 identifies a set of one or more services in the critical path that are highest in a ranked order determined by the set of variance correlation algorithms, wherein the identified set of one or more services are considered to be associated with the anomalous behavior.

Advantageously, as explained herein, illustrative embodiments use RFC and PCC to determine highly correlated microservices to application for SLO violations. The approach is effective regardless of dataset statistical distribution, and very robust and accurate in identifying malfunctioning services.

Further, illustrative embodiments use a DRQN to explore a directed acyclic graph associated with an application to find critical paths. Critical paths can be very dynamic and the DRQN can efficiently search and provide CP services. Advantageously, the methodology can be performed online and allows for exclusion of normal services thus improving computational efficiency and speed of correlative analysis.

Illustrative embodiments also advantageously do not require curated training datasets and can converge quickly with respect to services critical path discovery. This is important due to the challenging scale of a distributed edge system.

Still further, illustrative embodiments advantageously operate across edge and multicloud flexibly without modifications in edge cloud runtimes.

Illustrative embodiments also are configured to collect any types of SLO metrics and can flexibly use any of the collected metrics in service impairment isolation. By way of example only, multiple performance metrics can be collected at the application level for end-to-end performance including, but not limited to: (i) a response latency metric that specifies the elapsed time duration for the application or microservice to respond to a request; (ii) a performance metric that specifies a count of successful responses divided by all responses; and (iii) an availability metric that specifies the percent of time over a time period that the application or microservice is operational. These performance SLOs are part of a typical Kubernetes orchestration platform and largely available through standard observability frameworks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for application monitoring with service impairment isolation will now be described in greater detail with reference to FIGS. 6 and 7. Although described in the context of information processing system environment 100, these platforms may also be used to implement at least portions of other information processing systems in other embodiments.

Figure 6:
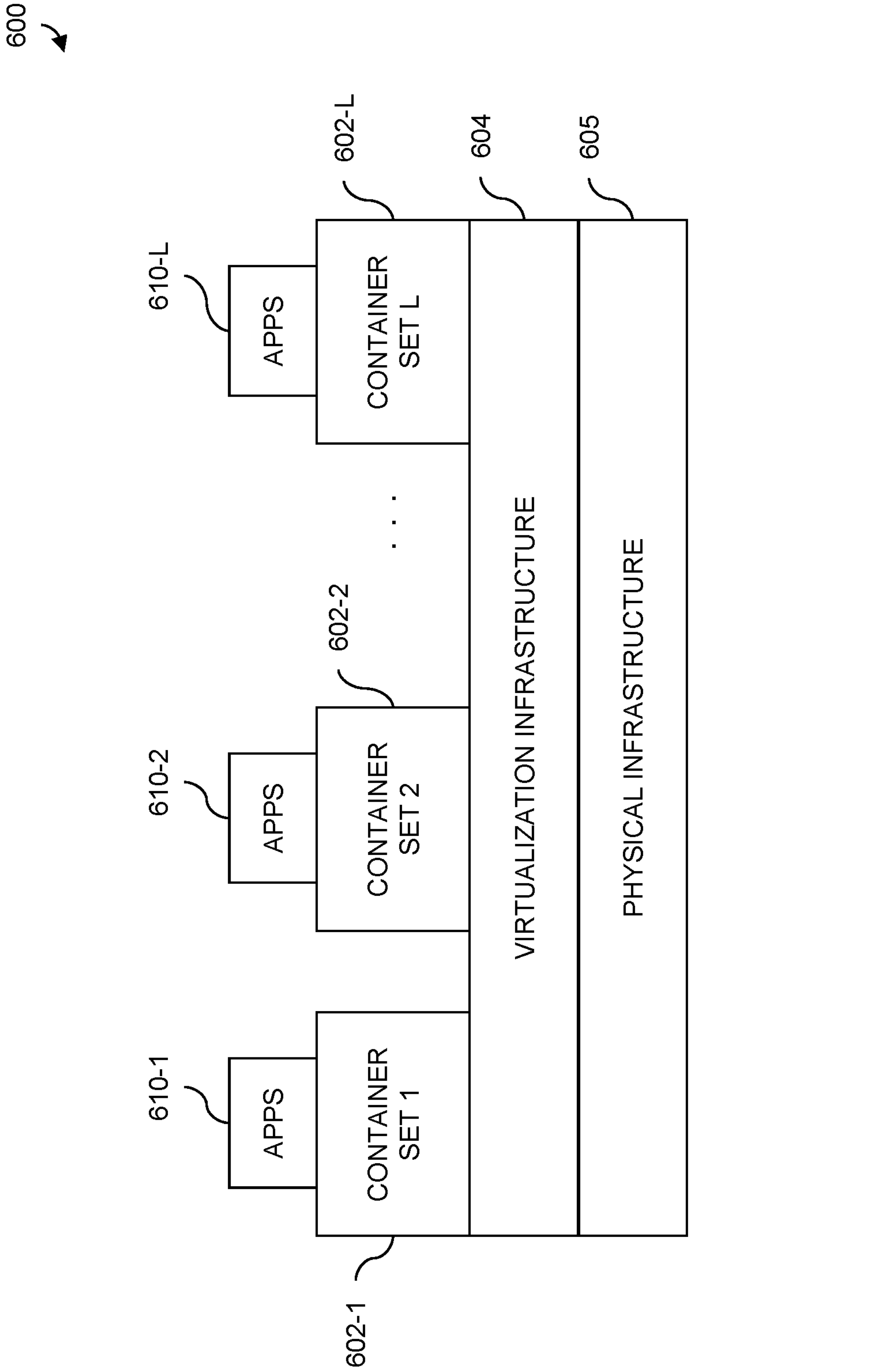
FIGS. 6 and 7 illustrate examples of processing platforms that may be utilized to implement at least a portion of an information processing system in illustrative embodiments.
Figure 7:
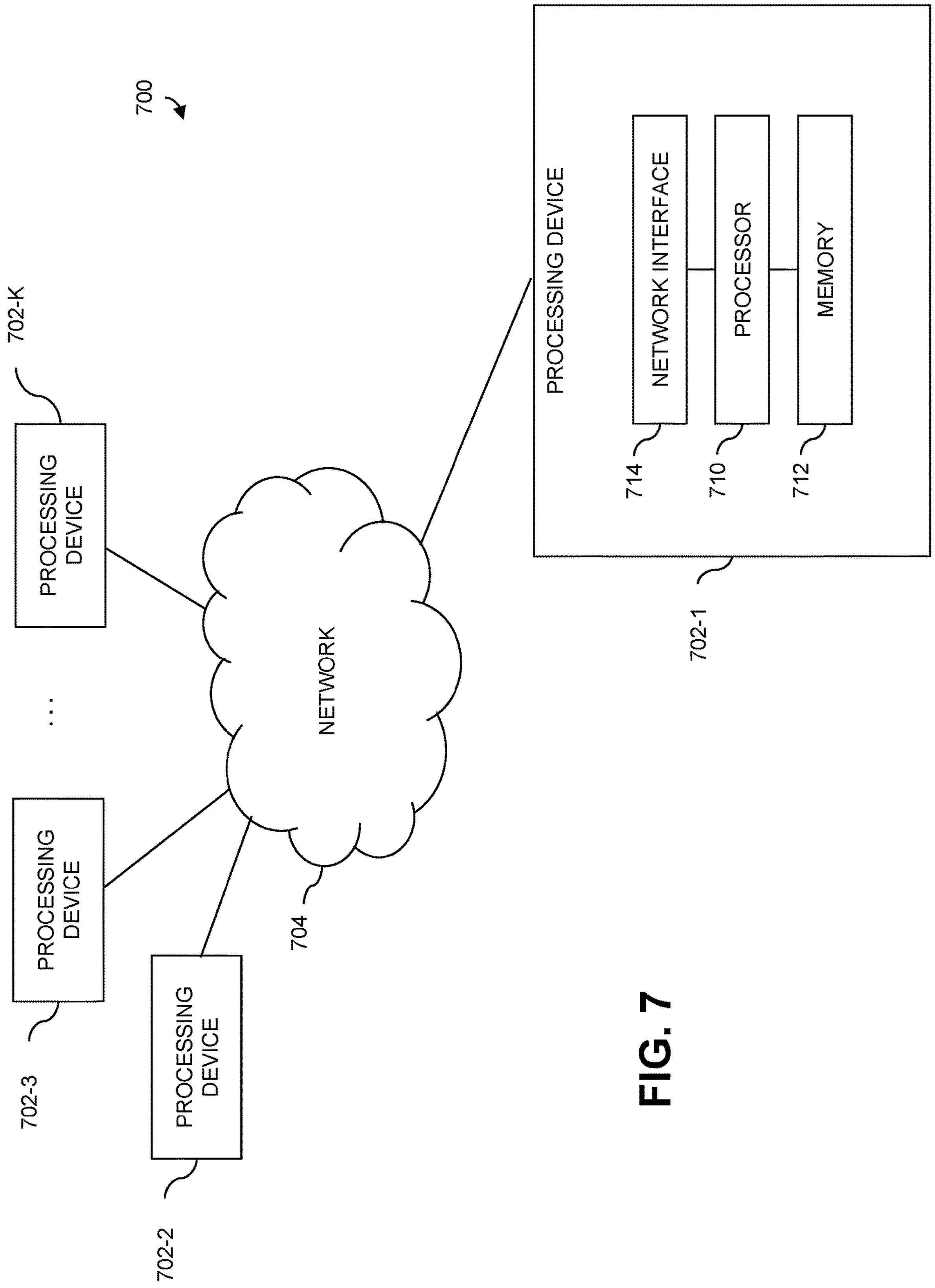

FIG. 6 shows an example processing platform comprising infrastructure 600. Infrastructure 600 comprises a combination of physical and virtual processing resources that may be utilized to implement at least a portion of the information processing system environment 100 in FIG. 1. Infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

Infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environment 100 may each run on a computer, server, storage device or other processing platform element. A given such element may be viewed as an example of what is more generally referred to herein as a "processing device." Infrastructure 600 shown in FIG. 6 may represent at least a portion of one processing platform. Another example of such a processing platform is processing platform 700 shown in FIG. 7.

The processing platform 700 in this embodiment comprises a portion of information processing system environment 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and information processing system environment 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with service impairment isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing platform comprising at least one processor coupled to at least one memory, the at least one processing platform, when executing program code, is configured to function as an application monitoring engine to:

obtain, by the application monitoring engine, an indication of at least one anomalous behavior associated with execution of an application in an information processing system, wherein the application comprises a plurality of services;

analyze, by the application monitoring engine, across a plurality of time periods, at least one metric associated with the execution of the application to determine at least one critical path associated with the execution of the application, wherein the critical path comprises at least a portion of the plurality of services, and wherein the plurality of time periods comprises a first time period prior to detection of the anomalous behavior, a second time period during detection of the anomalous behavior, and a third time period after activation of a trace on the application;

analyze, by the application monitoring engine, the critical path using a set of variance correlation algorithms;

identify, by the application monitoring engine, a set of one or more services in the critical path that are highest in a ranked order determined by the set of variance correlation algorithms, wherein the identified set of one or more services is considered to be associated with the anomalous behavior; and cause isolation, by the application monitoring engine, of at least one of the set of one or more services from executing in the information processing system.

2. The apparatus of claim 1, wherein analyzing the at least one metric to determine the at least one critical path comprises utilizing a reinforcement learning algorithm.

3. The apparatus of claim 2, wherein the reinforcement learning algorithm comprises utilizing a Deep Recurrent Q Network (DRQN) to analyze a graph associated with the execution of the application to extract a critical path for each of the plurality of time periods.

4. The apparatus of claim 1, wherein the set of variance correlation algorithms comprises a random forest classification-based algorithm, wherein a variance correlation result is computed by the random forest classification-based algorithm at an application level.

5. The apparatus of claim 4, wherein the set of variance correlation algorithms comprises a Pearson correlation coefficient-based algorithm, wherein a variance correlation result is computed by the Pearson correlation coefficient-based algorithm at a service level.

6. The apparatus of claim 5, wherein the ranked order determined by the set of variance correlation algorithms is generated by weighting the respective variance correlation results associated with the random forest classification-based algorithm and the Pearson correlation coefficient-based algorithm.

7. The apparatus of claim 1, wherein the plurality of services comprises microservices.

8. The apparatus of claim 1, wherein the information processing system comprises a distributed edge system.

9. The apparatus of claim 8, wherein the distributed edge system is part of a multicloud edge platform.

10. A computer program product comprising a non-transitory processor-readable storage medium having stored therein program code of one or more software programs, wherein the program code when executed by at least one processing device causes the at least one processing device to function as an application monitoring engine to:

obtain, by the application monitoring engine, an indication of at least one anomalous behavior associated with execution of an application in an information processing system, wherein the application comprises a plurality of services;

analyze, by the application monitoring engine, across a plurality of time periods, at least one metric associated with the execution of the application to determine at least one critical path associated with the execution of the application, wherein the critical path comprises at least a portion of the plurality of services, and wherein the plurality of time periods comprises a first time period prior to detection of the anomalous behavior, a second time period during detection of the anomalous behavior, and a third time period after activation of a trace on the application;

analyze, by the application monitoring engine, the critical path using a set of variance correlation algorithms;

identify, by the application monitoring engine, a set of one or more services in the critical path that are highest in a ranked order determined by the set of variance correlation algorithms, wherein the identified set of one or more services is considered to be associated with the anomalous behavior; and cause isolation, by the application monitoring engine, of at least one of the set of one or more services from executing in the information processing system.

11. The computer program product of claim 10, wherein analyzing the at least one metric to determine the at least one critical path comprises utilizing a reinforcement learning algorithm.

12. The computer program product of claim 10, wherein the set of variance correlation algorithms comprises a random forest classification-based algorithm, wherein a variance correlation result is computed by the random forest classification-based algorithm at an application level.

13. The computer program product of claim 12, wherein the set of variance correlation algorithms comprises a Pearson correlation coefficient-based algorithm, wherein a variance correlation result is computed by the Pearson correlation coefficient-based algorithm at a service level.

14. A method comprising:

obtaining, by an application monitoring engine, an indication of at least one anomalous behavior associated with execution of an application in an information processing system, wherein the application comprises a plurality of services;

analyzing, by the application monitoring engine, across a plurality of time periods, at least one metric associated with the execution of the application to determine at least one critical path associated with the execution of the application, wherein the critical path comprises at least a portion of the plurality of services, and wherein the plurality of time periods comprises a first time period prior to detection of the anomalous behavior, a second time period during detection of the anomalous behavior, and a third time period after activation of a trace on the application;

analyzing, by the application monitoring engine, the critical path using a set of variance correlation algorithms;

identifying, by the application monitoring engine, a set of one or more services in the critical path that are highest in a ranked order determined by the set of variance correlation algorithms, wherein the identified set of one or more services is considered to be associated with the anomalous behavior; and causing isolation, by the application monitoring engine, of at least one of the set of one or more services from executing in the information processing system;

wherein the steps are implemented on a processing platform comprising at least one processor configured to function as the application monitoring engine, coupled to at least one memory, executing program code.

15. The method of claim 14, wherein analyzing the at least one metric to determine the at least one critical path comprises utilizing a reinforcement learning algorithm.

16. The method of claim 14, wherein the set of variance correlation algorithms comprises a random forest classification-based algorithm, wherein a variance correlation result is computed by the random forest classification-based algorithm at an application level.

17. The method of claim 16, wherein the set of variance correlation algorithms comprises a Pearson correlation coefficient-based algorithm, wherein a variance correlation result is computed by the Pearson correlation coefficient-based algorithm at a service level.

18. The computer program product of claim 10, wherein the plurality of services comprises microservices.

19. The computer program product of claim 10, wherein the information processing system comprises a distributed edge system.

20. The computer program product of claim 19, wherein the distributed edge system is part of a multicloud edge platform.

* * * * *